(12) United States Patent
Komazawa

(10) Patent No.: US 12,081,716 B2
(45) Date of Patent: Sep. 3, 2024

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Hisao Komazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 534 days.

(21) Appl. No.: 17/159,110

(22) Filed: Jan. 26, 2021

(65) Prior Publication Data

US 2022/0086304 A1    Mar. 17, 2022

(30) Foreign Application Priority Data

Sep. 17, 2020 (JP) ................................ 2020-155975

(51) Int. Cl.
*H04N 1/00*    (2006.01)
*H04N 1/32*    (2006.01)

(52) U.S. Cl.
CPC ..... *H04N 1/32683* (2013.01); *H04N 1/00029* (2013.01); *H04N 1/00037* (2013.01); *H04N 1/00058* (2013.01)

(58) Field of Classification Search
None
See application file for complete search history.

(56) References Cited

U.S. PATENT DOCUMENTS

| 6,321,266 B1* | 11/2001 | Yokomizo | H04N 1/32529 709/226 |
| 2011/0157631 A1* | 6/2011 | Tsutsumi | G06F 3/126 358/1.15 |
| 2020/0081674 A1* | 3/2020 | Fukami | G06F 3/1205 |

FOREIGN PATENT DOCUMENTS

| JP | H07225660 | | 8/1995 | |
| JP | H11134144 | | 5/1999 | |
| JP | 4003301 | * | 6/1999 | ............... G06F 3/12 |
| JP | 2000155664 | * | 6/2000 | ............... G06F 3/12 |
| JP | 2000339126 | * | 12/2000 | ............... G06F 3/12 |
| JP | 2003050685 | * | 2/2003 | ............... G06F 3/12 |
| JP | 2003296086 | * | 10/2003 | ............... G06F 3/12 |
| JP | 2004058354 | * | 2/2004 | ............... G06F 3/12 |
| JP | 2007072063 | * | 3/2007 | ............... G06F 3/12 |
| JP | 2007272762 | | 10/2007 | |
| JP | 2010272005 | | 12/2010 | |
| JP | 2011062942 | * | 3/2011 | ............... G06F 3/12 |
| JP | 2018194927 | * | 12/2018 | ............... G06F 3/12 |
| JP | 2019006073 | * | 1/2019 | ............... B41J 2/01 |
| JP | 2019008116 | | 1/2019 | |

OTHER PUBLICATIONS

"Office Action of Japan Counterpart Application", issued on Apr. 30, 2024, with English translation thereof, pp. 1-8.

* cited by examiner

*Primary Examiner* — Beniyam Menberu
(74) *Attorney, Agent, or Firm* — JCIPRNET

(57) ABSTRACT

An information processing apparatus includes a processor configured to acquires failure information being information regarding processing failure occurring in a medium processing system that has performed processing on a recording medium based on a processing request, and specify an alternative processing system being another medium processing system that is to perform the processing request, based on the acquired failure information.

11 Claims, 7 Drawing Sheets

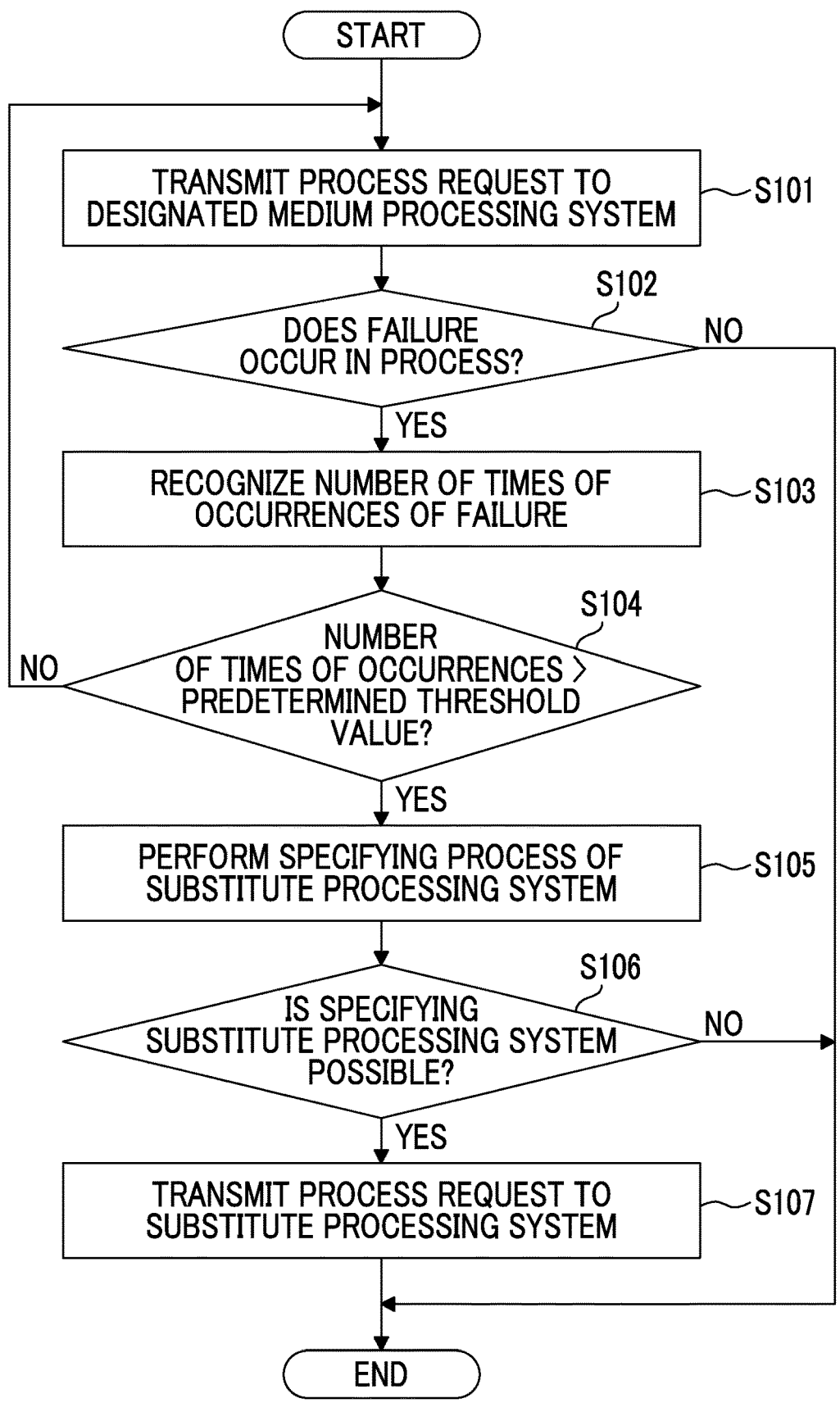

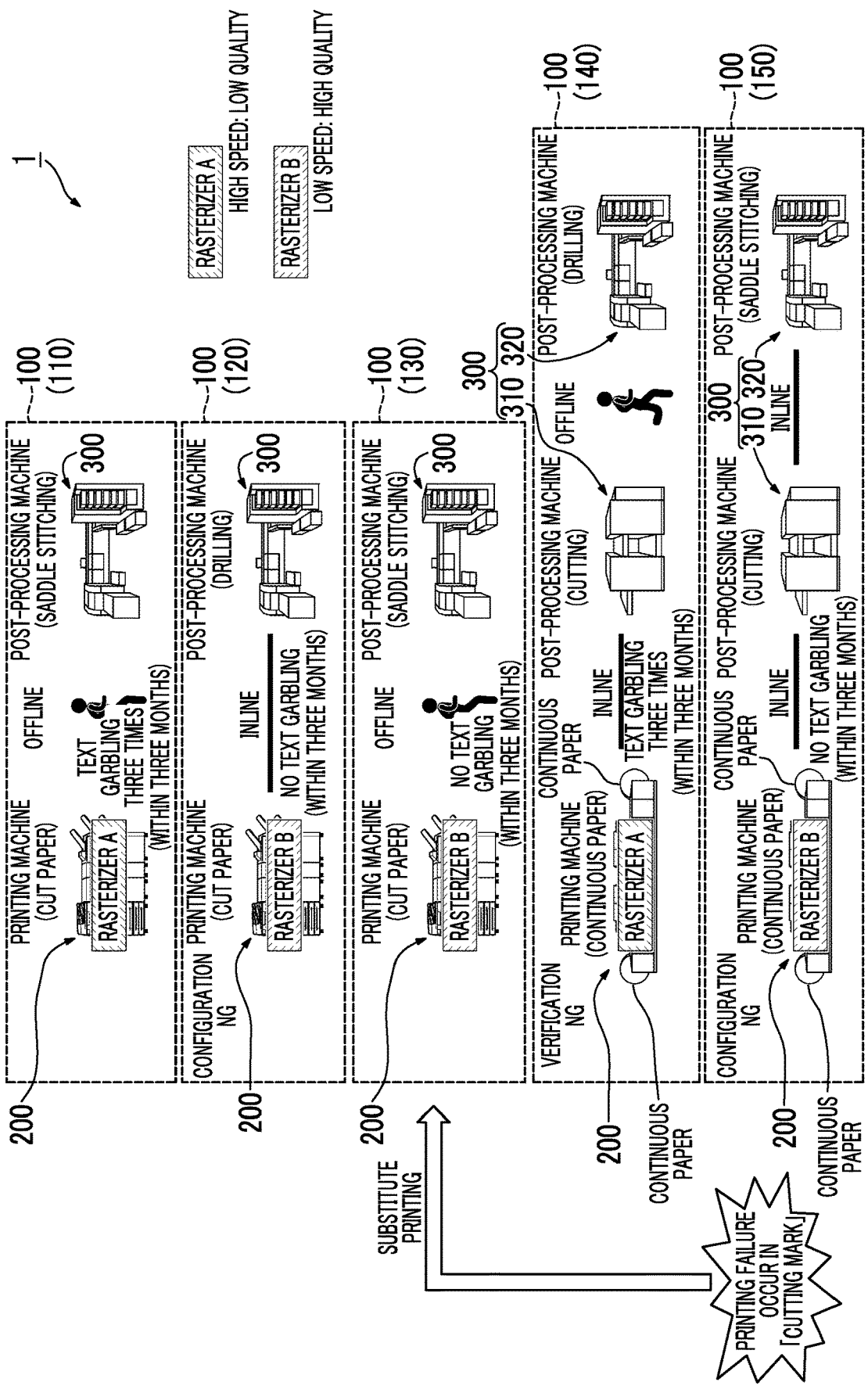

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-155975 filed Sep. 17, 2020.

BACKGROUND

(i) Technical Field

The present invention relates to an information processing apparatus and a non-transitory computer readable medium storing a program.

(ii) Related Art

JP2007-272762A discloses processing in which a step control manager specifies a unique workflow from a second network workflow in accordance with preset selection conditions and generates a processing job definition file.

JP2019-008116A discloses a configuration including a control unit that controls image formation, a supply of a transfer medium, and a discharge of the transfer medium, and acquires a reading result obtained by an image reading unit reading an image on the transfer medium, and determines the quality of the image based on the reading result.

SUMMARY

In a case where processing failure occurs in a medium processing system that performs processing on a recording medium such as paper, the processing can be continued by migrating the processing intended to be performed in the medium processing system is migrated to another medium processing system.

In a case where the processing is just migrated to another medium processing system, there is a concern that similar processing failure occurs in this medium processing system.

Aspects of non-limiting embodiments of the present disclosure relate to an information processing apparatus and a non-transitory computer readable medium storing a program capable of specifying a medium processing system having a low possibility of causing similar processing failure in comparison to a case of specifying another medium processing system for continuing processing without considering details of the processing failure occurring in a medium processing system.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquires failure information being information regarding processing failure occurring in a medium processing system that has performed processing on a recording medium based on a processing request, and specify an alternative processing system being another medium processing system that is to perform the processing request, based on the acquired failure information.

BRIEF DESCRIPTION OF THE DRAWINGS

Exemplary embodiment(s) of the present invention will be described in detail based on the following figures, wherein:

FIG. 6 is a flowchart illustrating a series of processes performed in a case where a CPU specifies an alternative processing system; and FIG. 7 is a diagram illustrating another processing example.

DETAILED DESCRIPTION

Hereinafter, exemplary embodiments of the present invention will be described in detail with reference to the accompanying drawings.

Figure 1:
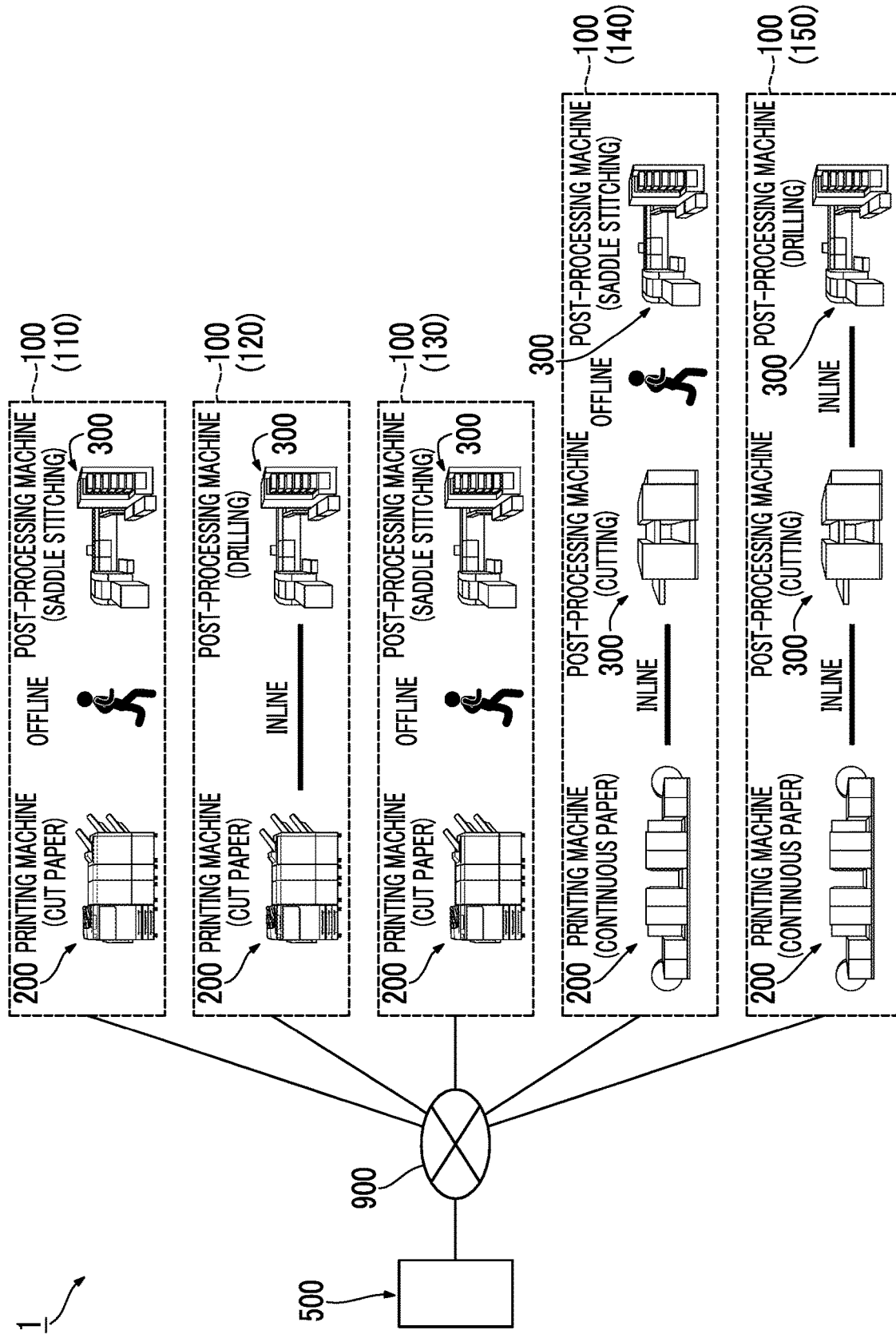
FIG. 1 is a diagram illustrating a configuration of a printing system according to an exemplary embodiment.

FIG. 1 is a diagram illustrating a configuration of a printing system according to an exemplary embodiment.

A printing system 1 in the exemplary embodiment includes a plurality of medium processing systems 100. The printing system 1 also includes a management server 500 connected to the plurality of medium processing systems 100.

The plurality of medium processing systems 100 and the management server 500 are connected to each other via a communication line 900 such as an Internet line.

Each of the medium processing systems 100 includes a printing machine 200 that performs printing on paper as an example of a recording medium, and a post-processing machine 300 that performs processing on the paper on which printing is performed by the printing machine 200.

Here, a printing method in the printing machine 200 is not particularly limited, and the printing machine 200 performs printing using a so-called electrophotographic method or printing using an inkjet method.

In the exemplary embodiment, each of the medium processing systems 100 has a printing function, but the printing function is not indispensable. In each of the medium processing systems 100, for example, only processing on paper on which printing has already been performed may be performed.

In the exemplary embodiment, five medium processing systems 100 being a first medium processing system 110 to a fifth medium processing system 150 are provided as the medium processing systems 100. The number of medium processing systems 100 installed is not particularly limited, and a configuration in which medium processing systems 100 of which the number is not five is provided may be made.

The first medium processing system 110 to the fifth medium processing system 150 may be installed in a commonplace such as one factory, or may be installed in different places.

In the printing machine 200 in the first medium processing system 110, cut paper is set and printing is performed on the cut paper. Here, the cut paper refers to, for example, rectangular paper produced by cutting a large-sized base paper.

The post-processing machine 300 in the first medium processing system 110 performs a binding processing on the cut paper on which printing has been performed by the printing machine 200.

Specifically, in the post-processing machine 300 in the first medium processing system 110, so-called saddle stitching is performed. Here, "saddle stitching" refers to performing a binding processing on a folded portion of a bundle of paper configured by a plurality of sheets of cut paper.

In the first medium processing system 110, the printing machine 200 and the post-processing machine 300 are connected in an off-line manner. Thus, the cut paper on which printing has been performed by the printing machine 200 is manually transported to the post-processing machine 300.

Figure 2:
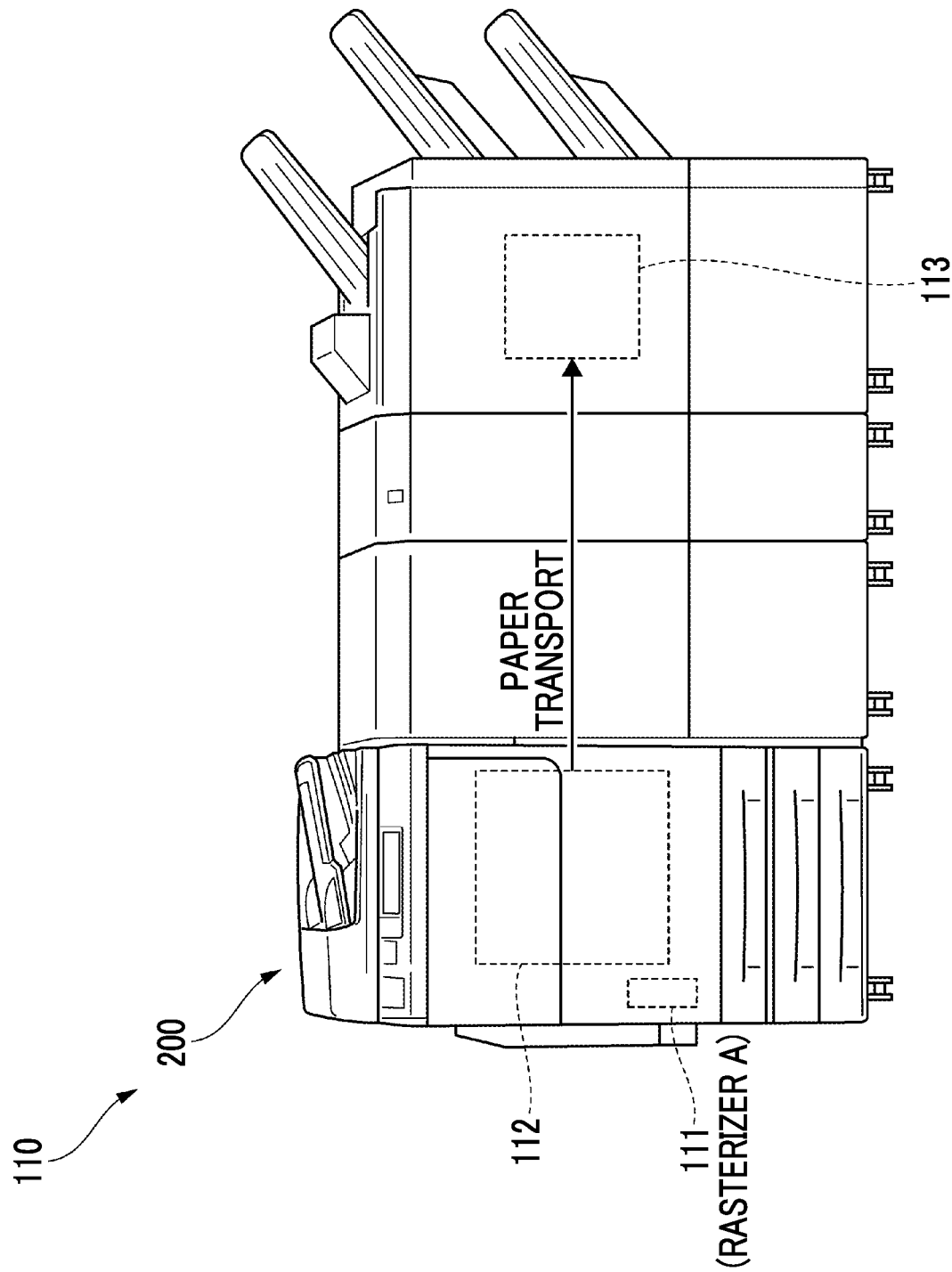
FIG. 2 is a diagram illustrating a printing machine provided in a first medium processing system.

FIG. 2 is a diagram illustrating the printing machine 200 provided in the first medium processing system 110.

The printing machine 200 in the first medium processing system 110 includes an image processing unit 111 that processes input image data.

The image processing unit 111 processes the image data by a predetermined first processing method. More specifically, the image processing unit 111 processes the image data by using "rasterizer A" being predetermined first software. Specifically, the image processing unit 111 uses the "rasterizer A" to perform a rasterization processing on the image data.

The printing machine 200 in the first medium processing system 110 includes a printing unit 112 that performs printing on paper using the image data processed by the image processing unit 111. The printing unit 112 performs printing on paper by using an electrophotographic method or an inkjet method.

The printing machine 200 also includes an inspection device 113 that inspects the paper after printing is completed.

In the exemplary embodiment, the paper after the printing is completed is transported to the inspection device 113, and an image formed on each sheet of paper is inspected.

Although not illustrated, in the exemplary embodiment, the printing machine 200 provided in each of a second medium processing system 120 (see FIG. 1) to the fifth medium processing system 150 similarly includes the image processing unit 111, the printing unit 112, and the inspection device 113.

Figure 3:
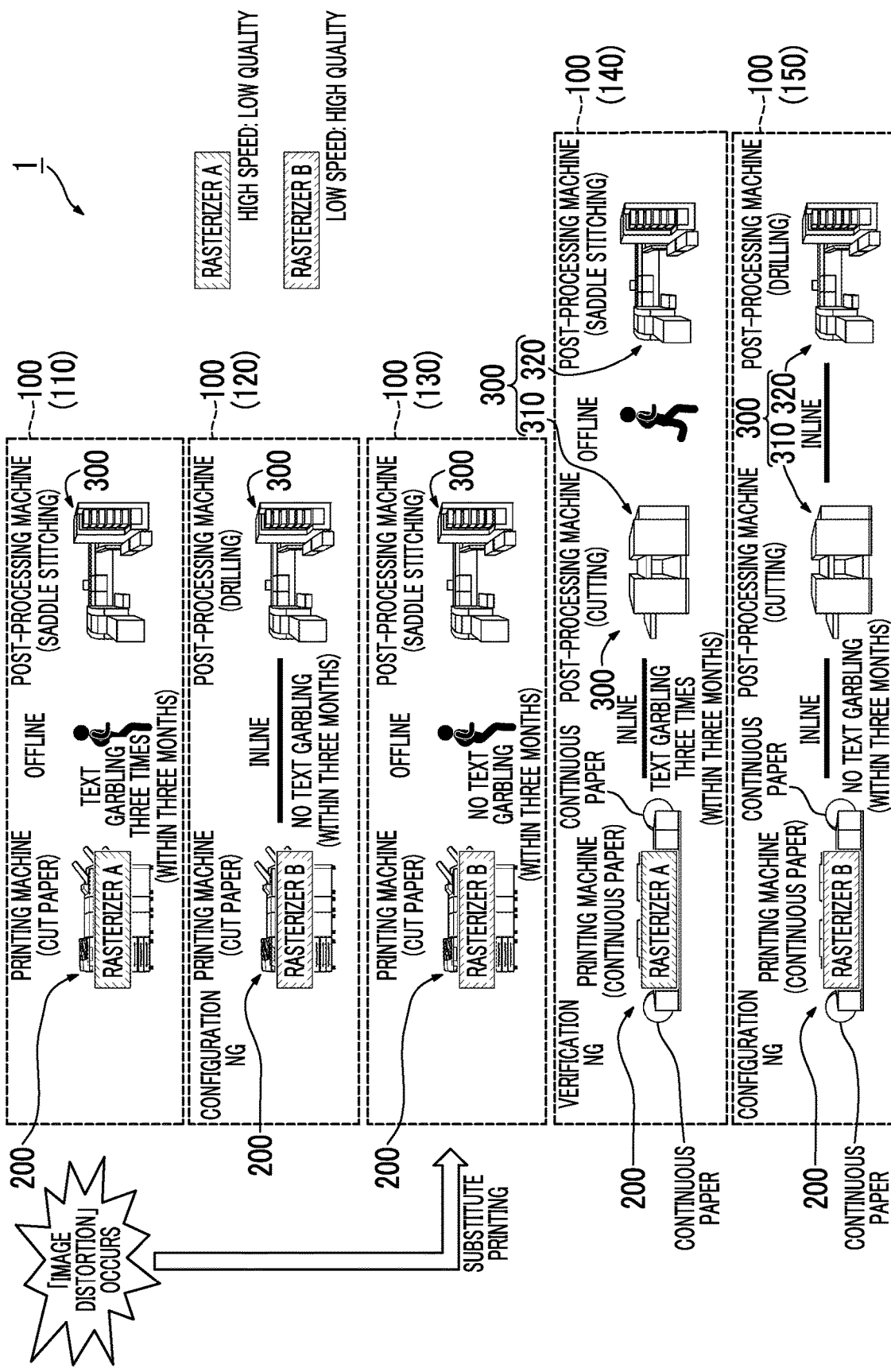
FIG. 3 is a diagram illustrating a state of each of first to fifth medium processing systems.

FIG. 3 is a diagram illustrating a state of each of the first medium processing system 110 to the fifth medium processing systems 150. In FIG. 3, the management server 500 is not illustrated.

The state of each of the first medium processing system 110 to the fifth medium processing system 150, and the configuration of each of the first medium processing system 110 to the fifth medium processing system 150 will be further described with reference to FIG. 3.

In the example illustrated in FIG. 3, text garbling have occurred three times in the printing machine 200 of the first medium processing system 110 within the past three months.

In other words, in the printing machine 200 of the first medium processing system 110, image distortion in which an image formed on paper (cut paper) is disturbed has occurred three times within the past three months.

In the printing machine 200 of the second medium processing system 120, cut paper is installed, and printing is performed on the cut paper. The post-processing machine 300 of the second medium processing system 120 performs a drilling processing on the cut paper on which printing has been performed by the printing machine 200.

In the second medium processing system 120, the printing machine 200 and the post-processing machine 300 are connected in an in-line manner. Thus, the cut paper on which printing has been performed by the printing machine 200 is automatically transported to the post-processing machine 300.

The image processing unit 111 (not illustrated) of the printing machine 200 in the second medium processing system 120 processes input image data by a second processing method different from the above first processing method. Specifically, the image processing unit 111 processes image data input to the second medium processing system 120, by using "rasterizer B" being predetermined second software.

In the exemplary embodiment, the rasterizer B is capable of performing processing with higher quality than the rasterizer A.

However, the rasterizer B requires more time to performing processing than the rasterizer A. In other words, in the exemplary embodiment, the processing speed in a case using the rasterizer A is higher than the processing speed in a case using the rasterizer B.

In this example, in the printing machine 200 of the second medium processing system 120, image distortion such as text garbling has not occurred within the past three months.

The third medium processing system 130 has an apparatus configuration similar to the configuration of the first medium processing system 110.

In the printing machine 200 of the third medium processing system 130, cut paper is set, and printing is performed on the cut paper.

The post-processing machine 300 of the third medium processing system 130 performs a binding processing on the cut paper on which printing has been performed by the printing machine 200. Specifically, saddle stitching is performed.

In the third medium processing system 130, the printing machine 200 and the post-processing machine 300 are connected in an off-line manner. Thus, the cut paper on which printing has been performed by the printing machine 200 is manually transported to the post-processing machine 300.

The image processing unit 111 (not illustrated) provided in the printing machine 200 of the third medium processing system 130 processes image data by the second processing method.

More specifically, the image processing unit 111 processes image data input to the third medium processing system 130, by using the "rasterizer B".

In the printing machine 200 of the third medium processing system 130, image distortion such as text garbling has not occurred within the past three months.

In the printing machine 200 of a fourth medium processing system 140, roll-shaped continuous paper is set and printing is performed on the continuous paper. In the fourth medium processing system 140, a first post-processing machine 310 and a second post-processing machine 320 are provided as the post-processing machine 300.

Here, the "continuous paper" refers to a base paper having a size capable of obtaining a plurality of cut papers, and is usually in a rolled state.

The first post-processing machine 310 cuts the continuous paper on which printing has been performed by the printing machine 200.

The second post-processing machine 320 performs saddle stitching on the paper produced by cutting of the first post-processing machine 310.

In the fourth medium processing system 140, the printing machine 200 and the first post-processing machine 310 are connected in an in-line manner. Thus, the continuous paper on which printing has been performed by the printing machine 200 is automatically transported to the first post-processing machine 310.

In the fourth medium processing system 140, the first post-processing machine 310 and the second post-processing machine 320 are connected in an off-line manner, and thus a plurality of sheets of paper produced by cutting of the first post-processing machine 310 are manually transported to the second post-processing machine 320.

The image processing unit 111 (not illustrated) of the printing machine 200 in the fourth medium processing system 140 processes image data by the first processing method. In other words, the image processing unit 111 uses the "rasterizer A" to processing the image data input to the fourth medium processing system 140.

In the printing machine 200 of the fourth medium processing system 140, image distortion such as text garbling has occurred three times within the past three months.

In the printing machine 200 of the fifth medium processing system 150, roll-shaped continuous paper is set and printing is performed on the continuous paper. In the fifth medium processing system 150, a first post-processing machine 310 and a second post-processing machine 320 are provided as the post-processing machine 300.

The first post-processing machine 310 cuts the continuous paper on which printing has been performed by the printing machine 200. The second post-processing machine 320 performs a drilling processing on the paper produced by cutting of the first post-processing machine 310.

In the fifth medium processing system 150, the printing machine 200 and the first post-processing machine 310 are connected in an in-line manner. Thus, the continuous paper on which printing has been performed by the printing machine 200 is automatically transported to the first post-processing machine 310.

In the fifth medium processing system 150, the first post-processing machine 310 and the second post-processing machine 320 are connected in an inline manner, and thus a plurality of sheets of paper produced by cutting of the first post-processing machine 310 are automatically transported to the second post-processing machine 320.

The image processing unit 111 (not illustrated) of the printing machine 200 in the fifth medium processing system 150 processes image data by the second processing method. Specifically, the image processing unit 111 uses the "rasterizer B" to processing image data input to the fifth medium processing system 150.

In the printing machine 200 of the fifth medium processing system 150, image distortion such as text garbling has not occurred within the past three months.

Figure 4:
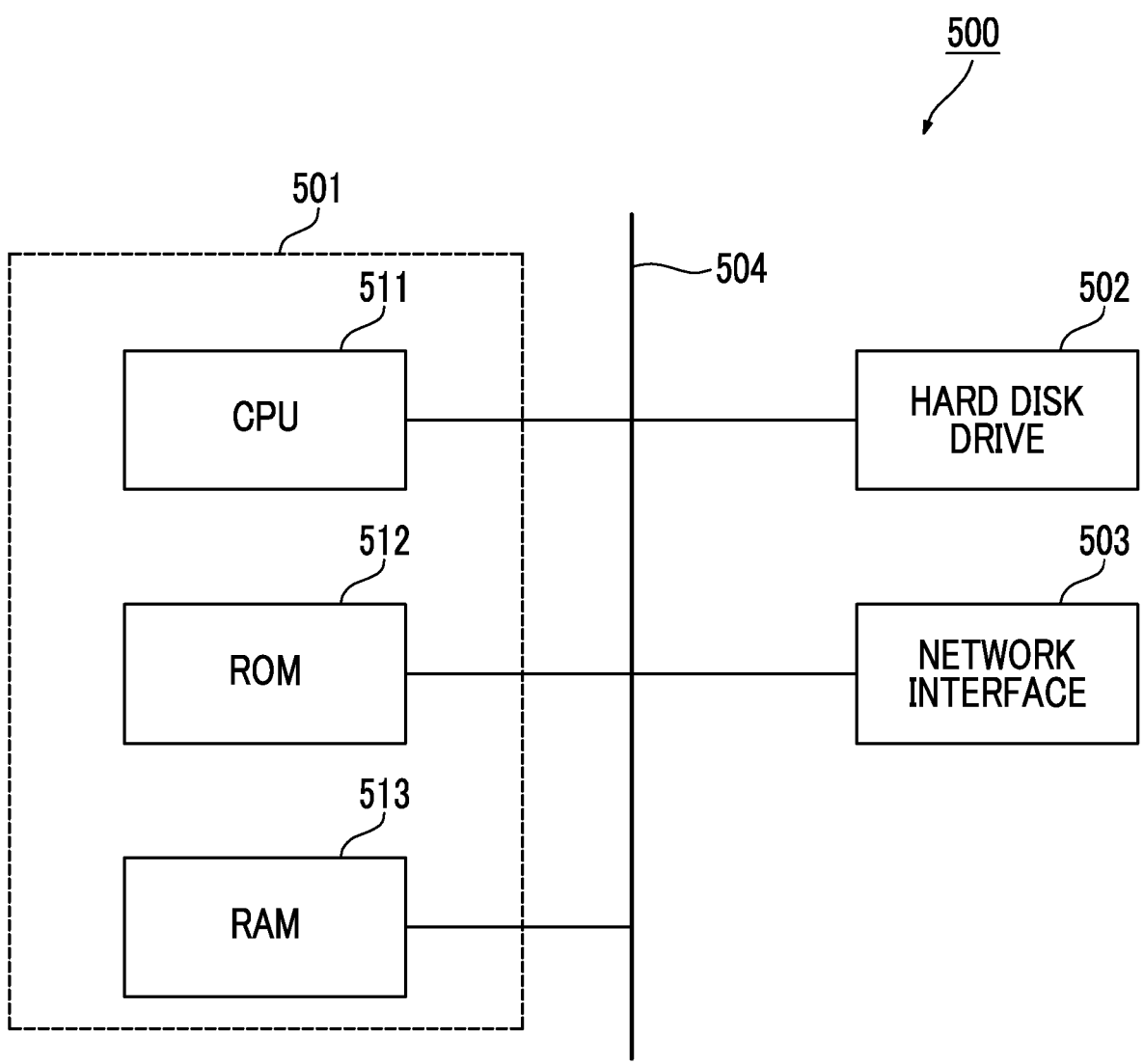
FIG. 4 is a diagram illustrating a hardware configuration of a management server.

FIG. 4 is a diagram illustrating a hardware configuration of the management server 500.

The management server 500 as an example of an information processing apparatus includes a control unit 501 that controls an operation of the whole apparatus, a hard disk drive 502 as an example of an information storage device that stores information, and a network interface 503 that realizes a communication via a local area network (LAN).

The control unit 501 includes a central processing unit (CPU) 511 as an example of a processor, a read only memory (ROM) 512 in which basic software, a basic input output system (BIOS), and the like are stored, and a random access memory (RAM) 513 used as a work area.

The CPU 511 may be multi-core. The ROM 512 may be a rewritable non-volatile semiconductor memory. The control unit 501 is a so-called computer.

In the exemplary embodiment, the CPU 511 executes a program stored in the ROM 512 or the like to perform processing described later.

The hard disk drive 502 is a device that reads and writes data to and from a non-volatile storage medium in which a magnetic material is coated on the surface of a disk-shaped substrate. The non-volatile storage medium may be a semiconductor memory or a magnetic tape.

In addition, the management server 500 also includes an input device such as a keyboard and a mouse, and a display device such as a liquid crystal display, as necessary.

The control unit 501, the hard disk drive 502, and the network interface 503 are connected to each other via a bus 504 or a signal line (not illustrated).

Here, the program to be executed by the CPU 511 is stored in a computer-readable recording medium such as a magnetic recording medium (such as a magnetic tape or a magnetic disk), an optical recording medium (such as an optical disk), a magneto-optical recording medium, or a semiconductor memory. In this state, the program may be provided for the management server 500.

The program to be executed by the CPU 511 may be provided for the management server 500 using a communication section such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiment, in a case where processing failure occurs in the medium processing system 100 of one of the plurality of medium processing systems 100 provided, the CPU 511 as an example of the processor acquires failure information.

Specifically, the CPU 511 acquires information regarding processing failure occurring in one medium processing system 100 (referred to as a "failure-occurred system" below) in which processing failure has occurred, as failure information.

The CPU 511 specifies an alternative processing system based on the acquired failure information. The alternative processing system is another medium processing system 100 that is to perform a processing request input to the failure-occurred system.

Upon specifying of the alternative processing system, the CPU 511 basically specifies another medium processing system 100 in which failure specified by the failure information does not occur or the number of occurrences of the failure is small, as the alternative processing system.

After specifying the alternative processing system, the CPU 511 transmits the processing request to the specified alternative processing system. The alternative processing system performs processing based on the processing request. Thus, the processing based on the processing request is continuously performed.

The processing request includes image data as the source of an image to be printed on paper. The CPU 511 transmits the processing request including the image data to the specified alternative processing system.

In the alternative processing system, printing on paper is performed using the image data. Further, processing is performed on this paper by a post-processing device.

Here, in a case where processing failure has occurred, it may not be possible to simply eliminate the cause of the processing failure cannot be easily eliminated, and the processing failure may continue to occur.

In such a case, in the exemplary embodiment, the alternative processing system is automatically specified. Thus, in the exemplary embodiment, it is possible to more quickly perform the processing based on the processing request by another medium processing system 100.

The details of the processing performed by the CPU 511 in a case of specifying the alternative processing system will be specifically described.

In a case of specifying the alternative processing system, the CPU 511 specifies the alternative processing system based on the occurrence status of the processing failure specified by the failure information.

Specifically, for example, the CPU 511 firstly recognizes processing failure specified by the failure information. The CPU 511 acquires information regarding the number of occurrences of the processing failure in each of medium processing systems 100 other than the failure-occurred system.

The "information regarding the number of occurrences" has a concept including the frequency of occurrence. The information regarding the number of occurrences also includes information on the number of occurrences per unit time, in addition to an absolute numerical value indicating the number of occurrences.

The CPU 511 specifies another medium processing system 100 to which processing performed in the failure-occurred system is migrated, based on information regarding the number of occurrences of the processing failure in each of the other medium processing systems 100.

In the exemplary embodiment, the CPU 511 uses the specified other medium processing system 100 as the alternative processing system.

Here, in the exemplary embodiment, as described above, the information regarding the number of occurrences of processing failure is acquired as information regarding the occurrence status of the processing failure in each of the other medium processing systems 100.

Such information is not limited to this. For example, information regarding the degree of processing failure occurring in each of the other medium processing systems 100 may be acquired as the information regarding the occurrence status of processing failure.

As described above, in a case where the alternative processing system is specified after acquiring the information regarding the degree of processing failure, for example, another medium processing system 100 in which processing failure having a small degree has occurred is specified as the alternative processing system.

More specifically, another medium processing system 100 in which processing failure having a degree smaller than the degree of the processing failure occurring in the failure-occurred system has occurred is specified as the alternative processing system.

Alternatively, another medium processing system 100 in which no processing failure has occurred is specified as the alternative processing system.

Processing of specifying the alternative processing system based on the number of occurrences of processing failure will be further described.

In the exemplary embodiment, the CPU 511 specifies, for example, another medium processing system 100 in which the number of occurrences of processing failure is smaller than the number of occurrences of processing failure in the failure-occurred system, as the alternative processing system.

More specifically with reference to FIG. 3, in the example illustrated in FIG. 3, the first medium processing system 110 is the failure-occurred system. In other words, in the example illustrated in FIG. 3, the first medium processing system 110 is the medium processing system 100 as a target of acquiring failure information.

In the example illustrated in FIG. 3, in the first medium processing system 110, text garbling as an example of image distortion has occurred three times within the past three months. In the first medium processing system 110, image distortion frequently occurs. The "text garbling" refers to a state in which a character having a shape which is different from a shape planned to be originally formed is formed.

In this case, the CPU 511 specifies another medium processing system 100 in which the number of occurrences of processing failure is smaller than the number of occurrences of the processing failure in the first medium processing system 110, as the alternative processing system.

More specifically, the CPU 511 specifies, as the alternative processing system, another medium processing system 100 which has a small number of occurrences of processing failure and is capable of obtaining "a saddle-stitched booklet" being an achievement planned to be obtained in the failure-occurred system.

In other words, the CPU 511 specifies, as the alternative processing system, another medium processing system 100 in which the occurrence status of processing failure satisfies a predetermined condition, for example, the number of occurrences of processing failure is small, and which is capable of obtaining "a saddle-stitched booklet" which is to be obtained in the failure-occurred system.

Specifically, in this example, the CPU 511 specifies the third medium processing system 130 as the alternative processing system.

In the third medium processing system 130, image distortion has not occurred within the past three months. In the third medium processing system 130, a "saddle-stitched booklet" may be obtained.

Therefore, the CPU 511 specifies the third medium processing system 130 as the alternative processing system.

In other words, in this case, the CPU 511 specifies the third medium processing system 130 which has an apparatus configuration of the first medium processing system 110 being the failure-occurred system, and is capable of obtaining "a saddle-stitched booklet, as the alternative processing system.

The CPU 511 transmits a print instruction and a processing request to the third medium processing system 130 being the specified alternative processing system. Thus, the processing is started in the third medium processing system 130.

The embodiment is not limited to this. The CPU 511 may notify an operator and the like of information regarding the specified alternative processing system without transmitting the print instruction and the processing request to the specified alternative processing system.

In this case, the processing is started in the alternative processing system by the operator.

Here, also in the second medium processing system 120 (see FIG. 3), the number of occurrences of image distortion is less than the number of occurrences in the first medium processing system 110 being the failure-occurred system, similar to the third medium processing system 130.

However, the second medium processing system 120 has an apparatus configuration different from the first medium processing system 110, and thus an achievement obtained by the first medium processing system 110 is different from an achievement obtained by the second medium processing system 120.

Specifically, the achievement obtained by the first medium processing system 110 is a saddle-stitched booklet, and the achievement obtained by the second medium processing system 120 is a perforated printed matter.

The second medium processing system 120 does not have the apparatus configuration of the first medium processing system 110 being the failure-occurred system. In the exemplary embodiment, the achievement obtained by the first medium processing system 110 is different from the achievement obtained by the second medium processing system 120.

Therefore, the CPU 511 does not specify the second medium processing system 120 as the alternative processing system.

Similarly, in the fifth medium processing system 150, the number of occurrences of image distortion in the printing machine 200 is smaller than the number of occurrences of image distortion in the first medium processing system 110.

However, the fifth medium processing system 150 also has an apparatus configuration different from the first medium processing system 110, and thus an achievement obtained is different from the achievement obtained by the first medium processing system 110.

In other words, the fifth medium processing system 150 does not have the apparatus configuration of the first medium processing system 110, and the achievement obtained is different from the achievement obtained of the first medium processing system 110.

Therefore, the CPU 511 does not specify the fifth medium processing system 150 as the alternative processing system.

The fourth medium processing system 140 has an apparatus configuration including the device of the first medium processing system 110. Thus, in the fourth medium processing system 140, an achievement obtained by the first medium processing system 110 may be obtained.

In other words, the fourth medium processing system 140 includes the apparatus configuration of the first medium processing system 110, and the fourth medium processing system 140 may obtain an achievement obtained by the first medium processing system 110.

More specifically, the fourth medium processing system 140 includes the printing machine 200 and the post-processing machine 300 that produces a saddle-stitched booklet, and thus may obtain a saddle-stitched booklet.

However, in the fourth medium processing system 140, the number of occurrences of the image distortion in the printing machine 200 is not less than the number of occurrences of the image distortion in the first medium processing system 110.

Therefore, the CPU 511 does not specify the fourth medium processing system 140 as the alternative processing system.

The phrase "including the apparatus configuration of the first medium processing system 110" does not only mean that the system includes the devices which are exactly identical to the devices of the first medium processing system 110, but also means that the system includes a device that performs the identical function.

The phrase "including the apparatus configuration of the first medium processing system 110" does not mean that the system includes all the devices of the first medium processing system 110.

The phrase "including the apparatus configuration of the first medium processing system 110" means that the system includes at least devices required to the minimum for obtaining an achievement to be obtained by the first medium processing system 110 among the devices of the first medium processing system 110.

In the exemplary embodiment, as described above, another medium processing system 100 in which the number of occurrences of processing failure is less than the number of occurrences of processing failure in the failure-occurred system (first medium processing system 110 as the target of acquiring the failure information) in which the processing failure has occurred is specified as the alternative processing system.

In addition, upon specifying of the alternative processing system, for example, another medium processing system 100 in which the number of occurrences of processing failure is less than the number of occurrences of processing failure in the failure-occurred system and the number of occurrences of processing failure is less than a predetermined threshold value may be specified as the alternative processing system.

In this case, another medium processing system 100 in which no processing failure has occurred or the number of processing failure has been very small may be specified as the alternative processing system.

Here, each of the first medium processing system 110 to the fifth medium processing system 150 is configured to obtain a specific achievement.

Specifically, the first medium processing system 110, the third medium processing system 130, and the fourth medium processing system 140 are configured to obtain a saddle-stitched booklet.

The second medium processing system 120 and the fifth medium processing system 150 are configured to obtain a perforated printed matter.

Here, in the first medium processing system 110 (failure-occurred system) in which processing failure has occurred, a saddle-stitched booklet may be obtained as a specific achievement.

Upon specifying of the alternative processing system, as described above, the CPU 511 specifies the alternative processing system in consideration of information regarding the achievements obtained by the failure-occurred system and each of the other medium processing systems 100.

Specifically, as described above, the CPU 511 specifies another medium processing system 100 in which the occurrence status of processing failure satisfies a predetermined condition (another medium processing system 100 satisfying a condition, for example, the number of occurrences of processing failure is small).

At this time, the CPU 511 specifies another medium processing system 100 as the alternative processing system, in consideration of the information regarding the achievement obtained by each of the other medium processing systems 100.

Further describing with reference to the above specific example, the CPU 511 firstly recognizes "a saddle-stitched booklet" being an achievement obtained by the first medium processing system 110 as the failure-occurred system. The CPU 511 specifies another medium processing system 100, which is another medium processing system 100 from which "a saddle-stitched booklet" may be obtained, as the alternative processing system.

Specifically, in the exemplary embodiment, the CPU 511 specifies, for example, the third medium processing system 130 as the alternative processing system as described above.

In addition, the CPU 511 may specify another medium processing system 100 that processes image data input using the image processing software used by the failure-occurred system, as the alternative processing system.

More specifically, in this case, the CPU 511 specifies, as the alternative processing system, another medium processing system 100 in which the occurrence status of processing failure satisfies the predetermined condition and an achievement identical to an achievement obtained by the failure-occurred system is obtained, and which uses software identical to software used by the failure-occurred system.

Describing with a specific example, the image processing unit 111 of the first medium processing system 110 (see FIG. 3) being the failure-occurred system uses image processing software referred to as the rasterizer A, so as to processing input image data.

In this case, upon specifying of the alternative processing system, the CPU 511 specifies, as the alternative processing system, another medium processing system 100 similarly including the image processing unit 111 that processes image data input using software referred to as the rasterizer A.

More specifically, the CPU 511 specifies, as the alternative processing system, another medium processing system 100 that includes the image processing unit 111 that performs processing using the software referred to as the rasterizer A, and in which the number of occurrences of processing failure is small and an achievement identical to an achievement obtained by the first medium processing system 110 is obtained.

Figure 5:
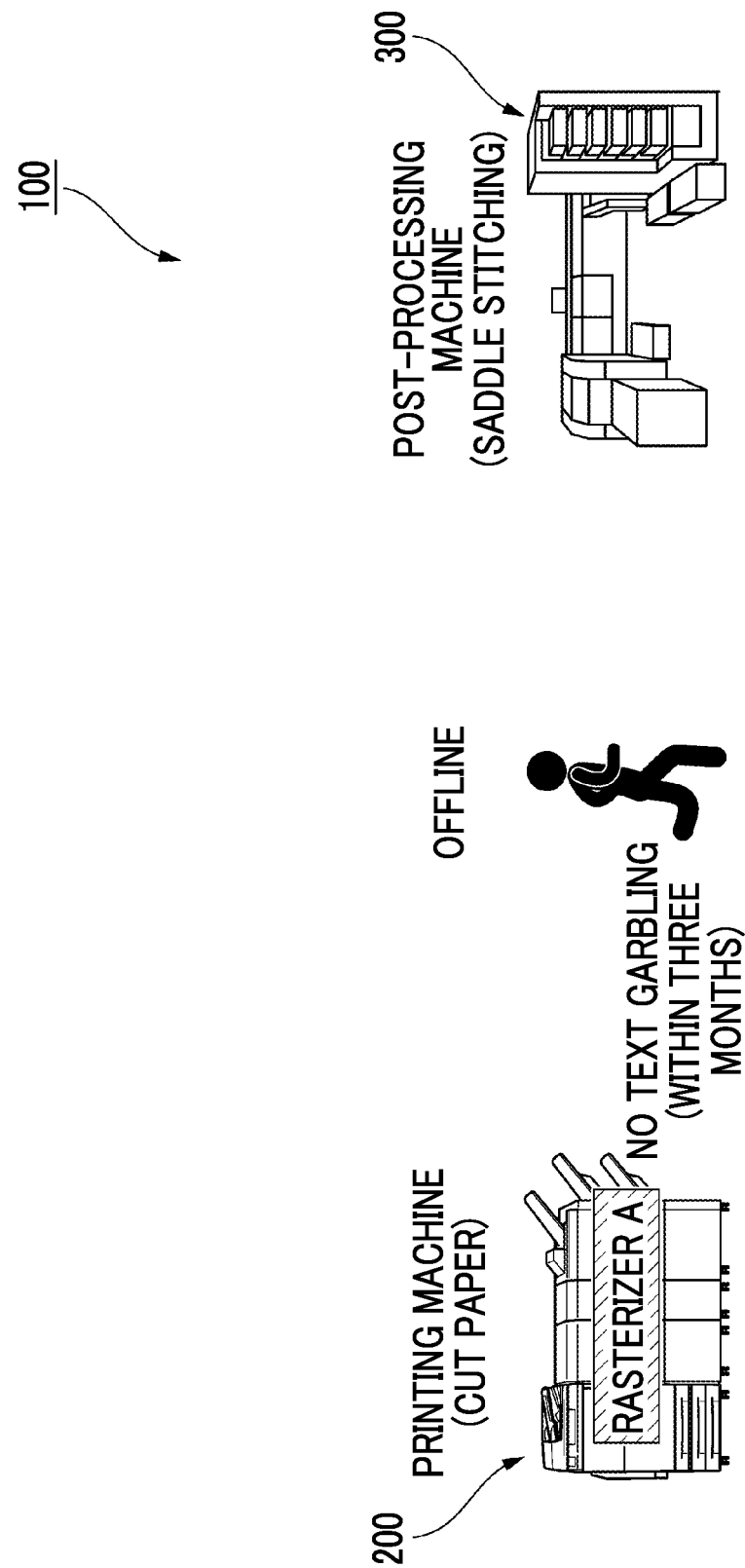
FIG. 5 is a diagram illustrating another example of a medium processing system.

Specifically, in this case, the CPU 511 specifies, for example, another medium processing system 100 illustrated in FIG. 5 (diagram illustrating another example of the medium processing system 100) as the alternative processing system.

The other medium processing system 100 illustrated in FIG. 5 is a medium processing system 100 that is not illustrated in FIG. 3.

The medium processing system 100 illustrated in FIG. 5 uses the rasterizer A.

As described above, in a case where there is a medium processing system 100 that uses the rasterizer A and has an apparatus configuration of the first medium processing system 110, the CPU 511 specifies the medium processing system 100 illustrated in FIG. 5, as the alternative processing system.

In this case, a situation in which an image planned to be formed on paper by the printing machine 200 in the failure-occurred system in which processing failure has occurred is different from an image formed by the printing machine 200 in the alternative processing system due to a difference of image processing occurs less frequently.

FIG. 6 is a flowchart illustrating a series of processes performed in a case where the CPU 511 specifies the alternative processing system.

Firstly, in a case where a print instruction is issued from the operator, the CPU 511 transmits a processing request including image data to a medium processing system 100 ("designated medium processing system 100" below) designated by the operator among the first medium processing system 110 to the fifth medium processing system 150 (Step S101).

The processing request includes other types of information such as a printing condition, in addition to the image data.

Thus, in the designated medium processing system 100, printing processing, an inspection processing by the inspection device 113, and processing by the post-processing machine 300 are sequentially performed.

Then, the CPU 511 acquires the inspection result by the inspection device 113 in the designated medium processing system 100, and determines whether or not processing failure has occurred, based on the inspection result (Step S102).

In a case where the CPU determines that processing failure has not occurred, the CPU 511 ends the processing for specifying the alternative processing system. In other words, in this case, the CPU 511 does not specify the alternative processing system.

In a case where the CPU 511 determines in Step S102 that processing failure has occurred, the CPU 511 acquires history information regarding the designated medium processing system 100, for example, the history information within the past three months.

More specifically, in the exemplary embodiment, the history information of each of the medium processing systems 100 is stored in the management server 500. The CPU 511 acquires history information regarding the designated medium processing system 100, which is the history information within the past three months, from the stored history information.

The CPU 511 adds 1 (number of inspection results in this time) to the total number of the previous inspection results (inspection results indicating that processing failure identical to the latest processing failure in this time has occurred) included in the history information. Thus, the CPU 511 recognizes the number of occurrences of processing failure from the three months ago to the present (Step S103).

The CPU 511 determines whether or not the recognized number of occurrences exceeds the predetermined threshold value (Step S104).

In a case where the CPU 511 does not determine that the number of occurrences exceeds the predetermined threshold value, the CPU 511 performs the processing of Step S101 again.

That is, the CPU 511 transmits the processing request to the designated medium processing system 100 again. More specifically, the CPU 511 transmits the processing request again to the designated medium processing system 100 after a return processing or the like is issued by the operator.

In a case where the CPU determines, in Step S104, that the number of occurrences exceeds the predetermined threshold value, the CPU 511 performs the processing of specifying the alternative processing system (Step S105). The alternative processing system is specified by the method described above.

Then, the CPU 511 determines whether or not it is possible to specify the alternative processing system (Step S106).

In a case where the CPU determines that it is possible to specify the alternative processing system, the CPU 511 transmits a processing request including image data to the alternative processing system (Step S107). Thus, the processing is started in the alternative processing system.

In a case where the CPU does not determine in Step S106 that it is possible to specify the alternative processing system, the CPU 511 transmits an error notification or the like to the operator or the like, and then ends the processing.

FIG. 7 is a diagram illustrating another processing example.

Some components of the apparatus in FIG. 7 is different from the configuration illustrated in FIG. 3. In FIG. 3, the fourth medium processing system 140 performs saddle stitching, and the fifth medium processing system 150 performs drilling. On the other hand, in FIG. 7, the fourth medium processing system 140 performs drilling, and the fifth medium processing system 150 performs saddle stitching.

Further, in this processing example, a case where processing failure occurs in the fifth medium processing system 150 will be described as an example. In other words, in this processing example, the fifth medium processing system 150 is the medium processing system 100 as a target of acquiring failure information.

In this processing example, a case where the CPU 511 specifies another medium processing system 100 that does not performs the processing that causes the processing failure as the alternative processing system will be described.

In other words, in this processing example, a case where the CPU 511 specifies, as the alternative processing system, another medium processing system 100 in which an achievement identical to an achievement obtained by the failure-occurred system is obtained even though the system does not perform the processing that causes the processing failure will be described.

More specifically, in this processing example, a case where printing failure occurs in "cutting mark" formed on paper by the printing machine 200 of the fifth medium processing system 150 will be described as an example.

Here, the cutting mark is a mark used for recognizing a portion to be cut by the first post-processing machine 310. The first post-processing machine 310 detects the cutting mark on continuous paper, and then cuts the continuous paper.

In a case where printing failure occurs in the "cutting mark", the CPU 511 may specify another medium processing system 100 in which the number of occurrences of processing failure in the cutting mark is small, as described above.

Instead of this, the CPU 511 may specify another medium processing system 100 that does not perform printing of the cutting mark.

Here, processing in a case of specifying another medium processing system 100 that does not perform printing of the cutting mark will be described.

In a case where the CPU 511 specifies another medium processing system 100 that does not perform printing of the cutting mark, the CPU 511 specifies another medium processing system 100 in which "a saddle-stitched booklet" being an achievement obtained by the fifth medium processing system 150 may be obtained even though printing of the cutting mark is not performed.

Specifically, in this example, the CPU 511 specifies the third medium processing system 130 as another medium processing system 100 that may obtain "a saddle-stitched booklet" without performing printing of the cutting mark.

In this processing example, the processing that causes the processing failure is processing for continuous paper. In this case, the CPU 511 specifies, as the alternative processing system, the third medium processing system 130 that may obtain "a saddle-stitched booklet" without performing the processing for the continuous paper.

In other words, the CPU 511 specifies, as the alternative processing system, the third medium processing system 130 that may obtain "a saddle-stitched booklet" only by using cut paper, not the continuous paper.

In this case, similarly, for example, the CPU 511 may specify, as the alternative processing system, another medium processing system 100 that processes image data by using the image processing software used by the fifth medium processing system 150 being the failure-occurred system.

More specifically, in the example illustrated in FIG. 7, the fifth medium processing system 150 being the failure-occurred system uses the rasterizer B.

In this case, for example, the CPU 511 may specify another medium processing system 100 that processes the image data input by using the rasterizer B, as an alternative processing system.

In the example illustrated in FIG. 7, the third medium processing system 130 specified as the alternative processing system uses the rasterizer B.

In this example, similar to the fifth medium processing system 150, the third medium processing system 130 uses the rasterizer B to processing image data input using the software used by the failure-occurred system.

Others

In the above description, a case where one medium processing system 100 is specified as the alternative processing system has been described, but in some cases, a plurality of medium processing systems 100 may be used as candidates for the alternative processing system.

In this case, the CPU 511 specifies the alternative processing system from the plurality of candidates in accordance with a predetermined condition.

Specifically, for example, the CPU 511 specifies the medium processing system 100 located closest to the failure-occurred system from a plurality of candidates, and specifies this medium processing system 100 as the alternative processing system.

In this case, for example, position information of each of the medium processing systems 100, such as position coordinates and address information, is registered in the management server 500 or the like in advance. The CPU 511 specifies the medium processing system 100 located closest to the failure-occurred system from the plurality of candidates, based on the position information.

In addition, for example, the CPU 511 may specify another medium processing system 100 having the minimum cost required to produce an achievement from the plurality of candidates, and specify the specified medium processing system 100 as the alternative processing system.

In this case, information regarding the cost of each of the medium processing systems 100 is registered in advance, and the CPU 511 specifies another medium processing system 100 having the minimum cost required, based on the registered information.

In addition, for example, the CPU 511 may specify another medium processing system 100 having the highest productivity (number of achievements produced per unit time) from the plurality of candidates and specify the specified medium processing system 100 as the alternative processing system.

Also in this case, information regarding the productivity of each of the medium processing systems 100 is registered in advance in the management server 500 or the like, and the CPU 511 specifies the other medium processing system 100 having the highest productivity based on the registered information.

In addition, for example, in a case where the medium processing system 100 using the rasterizer A and the medium processing system 100 using the rasterizer B are included in the plurality of candidates, and information indicating that the alternative processing system is to be specified with priority given to the productivity is registered, the CPU 511 specifies the medium processing system 100 using the rasterizer A.

As described above, the processing speed in the system using the rasterizer A is faster. In a case where the medium processing system 100 using the rasterizer A is specified, the medium processing system 100 having high productivity is specified.

In addition, for example, in a case where the medium processing system 100 using the rasterizer A and the medium processing system 100 using the rasterizer B are included in the plurality of candidates, and information indicating that the alternative processing system is to be specified with priority given to the quality is registered, the CPU 511 specifies the medium processing system 100 using the rasterizer B.

As described above, the system using the rasterizer B may perform the processing with higher quality. Ina case where the medium processing system 100 using the rasterizer B is specified, the medium processing system 100 that may obtain an achievement with higher quality is specified.

In addition, for example, it is assumed that the plurality of candidates include medium processing systems 100 having different printing methods in the printing machine 200.

In this case, for example, upon specifying of the alternative processing system to replace the failure-occurred system, the medium processing system 100 including the printing machine 200 that performs printing by the printing method used by the printing machine 200 of the failure-occurred system may be specified as the alternative processing system.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to
   acquire failure information being information regarding processing failure occurring in a medium processing system that has performed processing on a recording medium based on a processing request,
   specify an alternative processing system being another medium processing system that is to perform the processing request, based on the acquired failure information, and
   in a case where the processing that causes the processing failure is processing for continuous paper, specify, as the alternative processing system, another medium processing system not using the continuous paper but cut paper.

2. The information processing apparatus according to claim 1,
   wherein the processor is configured to specify the alternative processing system being the other medium processing system that is to perform the processing request, based on an occurrence status of the processing failure specified by the failure information, the occurrence status of the processing failure being in the other medium processing system.

3. The information processing apparatus according to claim 2,
   wherein the processor is configured to specify the alternative processing system being the other medium processing system that is to perform the processing request, based on information regarding the number of occurrences of processing failure in the other medium processing system.

4. The information processing apparatus according to claim 3,
   wherein the processor is configured to specify, as the alternative processing system, another medium processing system having the number of occurrences of processing failure, which is smaller than the number of occurrences of processing failure in the medium processing system in which the processing failure has occurred.

5. The information processing apparatus according to claim 4,
   wherein the processor is configured to specify, as the alternative processing system, another medium processing system having the number of occurrences of processing failure, which is smaller than the number of occurrences of processing failure in the medium processing system in which the processing failure has occurred, and is smaller than a predetermined threshold value.

6. The information processing apparatus according to claim 2,
   wherein the processor is configured to specify, as the alternative processing system, another medium processing system in which an occurrence status of the processing failure satisfies a predetermined condition, the other medium processing system including an apparatus configuration of the medium processing system in which the processing failure has occurred.

7. The information processing apparatus according to claim 2,
   wherein the medium processing system in which the processing failure has occurred is configured to obtain a specific achievement, and
   the processor is configured to specify, as the alternative processing system, another medium processing system in which an occurrence status of the processing failure satisfies a predetermined condition and the specific achievement is obtained.

8. The information processing apparatus according to claim 2, wherein the processor is configured to specify, as the alternative processing system, another medium processing system in which an occurrence status of the processing failure satisfies a predetermined condition, the other medium processing system performing processing on image data input using image processing software that is used in the medium processing system in which the processing failure has occurred.

9. The information processing apparatus according to claim 1, wherein the medium processing system in which the processing failure has occurred is further configured to obtain a specific achievement, and the processor is further configured to specify, as the alternative processing system, another medium processing system in which the specific achievement is obtained without performing the processing that causes the processing failure.

10. A non-transitory computer readable medium storing a program causing a computer to implement:

an acquisition function of acquiring failure information being information regarding processing failure occurring in a medium processing system that has performed processing on a recording medium based on a processing request;

a specifying function of specifying an alternative processing system being another medium processing system that is to perform the processing request, based on the failure information acquired by the acquisition function; and a function of specifying, as the alternative processing system, another medium processing system not using the continuous paper but cut paper in a case where the processing that causes the processing failure is processing for continuous paper.

11. An information processing apparatus comprising:

means for acquiring failure information being information regarding processing failure occurring in a medium processing system that has performed processing on a recording medium based on a processing request, and means for specifying an alternative processing system being another medium processing system that is to perform the processing request, based on the acquired failure information, and means for specifying, as the alternative processing system, another medium processing system not using the continuous paper but cut paper in a case where the processing that causes the processing failure is processing for continuous paper.

* * * * *